United States Patent [19]

Smith et al.

[11] Patent Number: 5,046,279
[45] Date of Patent: Sep. 10, 1991

[54] CARRYING CASE FOR FISHING ROD AND REEL

[76] Inventors: Murray A. Smith, 382 North 100 West, #4, Logan, Utah 84321; Mark W. Lichfield, P.O. Box 13, Wellsville, Utah 84339

[21] Appl. No.: 587,216

[22] Filed: Sep. 24, 1990

[51] Int. Cl.$^5$ .............................................. A01K 97/08
[52] U.S. Cl. ........................................ 43/26; 224/922
[58] Field of Search ...................... 43/26; 16/319, 321; 403/108, 93, 92, 328; 224/922

[56] References Cited

U.S. PATENT DOCUMENTS

| | | | |
|---|---|---|---|
| 2,149,087 | 2/1939 | Fisher | 43/26 |
| 2,591,674 | 4/1952 | Chalker | 43/26 |
| 3,349,512 | 10/1967 | Walker | 43/26 |
| 3,662,933 | 5/1972 | Michal | 43/26 |
| 3,674,190 | 7/1972 | Wright | 43/26 |
| 4,171,588 | 10/1979 | Hoffman et al. | 43/26 |

Primary Examiner—Richard K. Seidel
Assistant Examiner—Jeanne M. Elpel
Attorney, Agent, or Firm—Terry M. Crellin

[57] ABSTRACT

A carrying case for a fishing rod and reel comprises an elongate hollow tube that is closed at its first end and is adapted to receive a fishing rod therein from its open, second end. A reel receiving chamber is attached to the open, second end of the tube. The chamber has opposite sides, a closed top and a forward wall. An opening is provided in the forward wall of the chamber, with the opening being in alignment with the open end of the tube. The rearward end of the chamber is open such that a rod and an attached reel can be received through the open rearward end to position the rod in the tube and the reel in the chamber. A closure member fits against and closes the open rearward end of the chamber, with the closure member being pivotally connected to the sides of the chamber so that the closure member can be pivoted downwardly beneath the chamber to expose the open rearward end of the chamber.

3 Claims, 2 Drawing Sheets

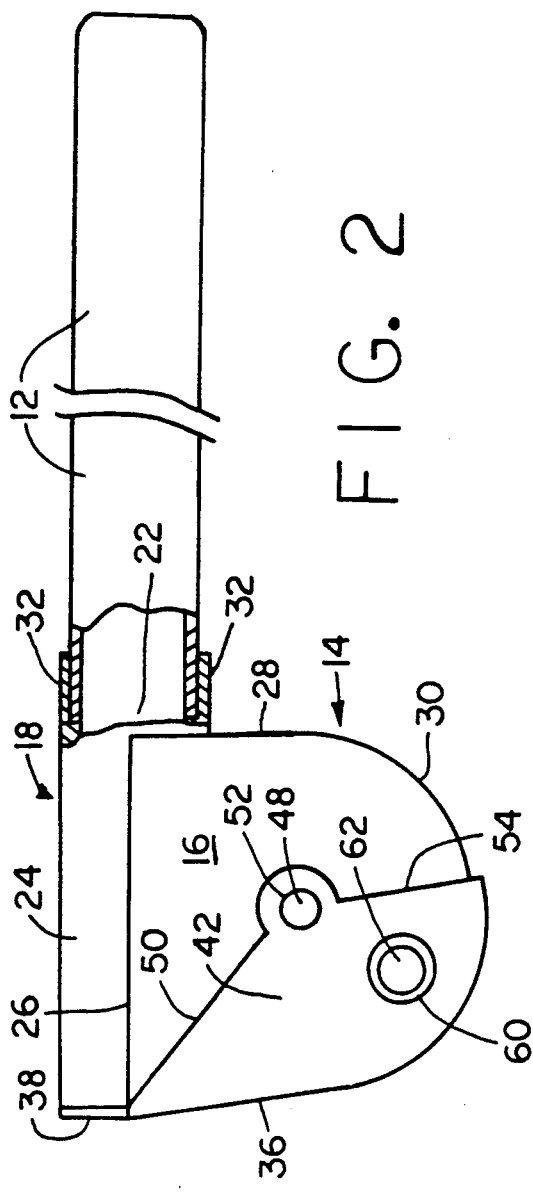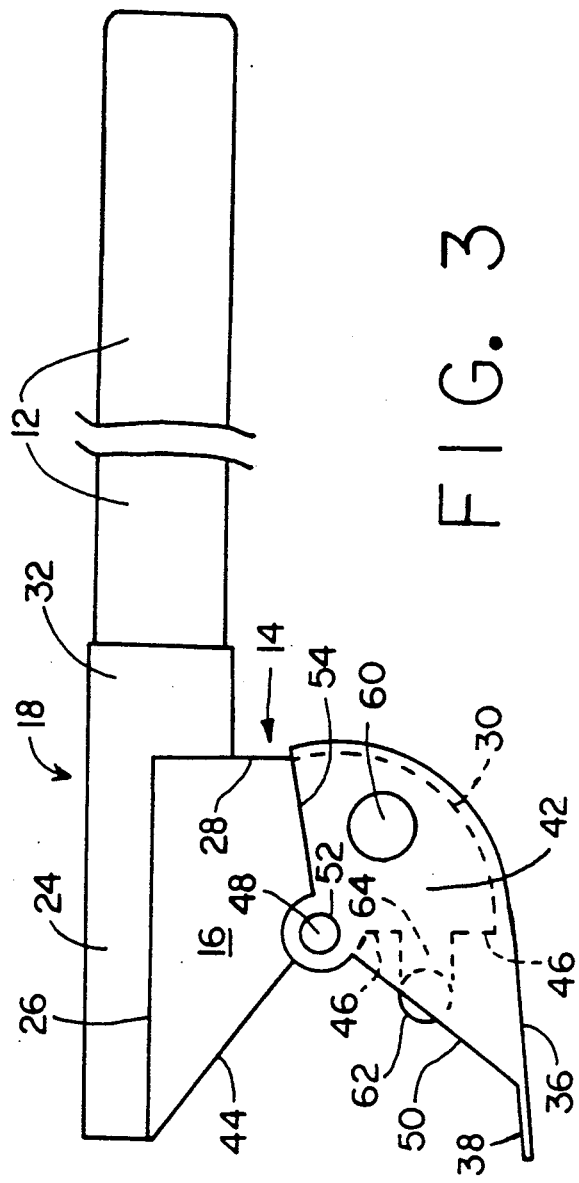

CARRYING CASE FOR FISHING ROD AND REEL

BACKGROUND OF THE INVENTION

1. Field of the Invention

The present invention relates to a carrying case for a fishing rod and reel, wherein the rod and reel can be positioned in the case without removing the reel from the rod.

2. State of the Art

Carrying cases for fishing rods are well known. Early cases comprised hollow tubes having a closed end and a removable end. The fishing rod was disassembled and the reel removed from the fishing rod. The disassembled sections of the rod were then placed in a cloth retainer, and the cloth retainer containing the section of the pole was slid into the hollow tube.

The patent literature discloses several attempts to produce a carrying case which will receive a fishing rod with the reel still attached to the rod. Several patents, including U.S. Pat. Nos. 2,902,790; 2,650,449 and 3,641,697 show cases which are open along one side of the full length of the case. Covers for the open sides are provided, with the covers either sliding in place along the case or being hinged to the case to close the open sides. These cases closely resemble gun cases or violin cases in their opening and closing action.

The patent literature also shows attempts to utilize elongate, hollow tubes having a closed end and an open end. Storage compartments have been located adjacent to the open end of the tube. In U.S. Pat. No. 3,349,512, the storage compartment has a door comprising the entire upper side of the compartment. The storage compartment and door are bulky and clumsy. In U.S. Pat. No. 4,171,588, a carrier is provided having an elongate An enlarged, tubular compartment is integrally attached to the tubular compartment to receive a reel still attached to the rod. A cap member snap fits on the open end of the enlarged tubular compartment to close the rod and reel in the carrier. The cap member, being a separable part, is easily lost or misplaced.

3. Objectives

A principal objective of the invention is to provide a novel, relatively inexpensive carrying case for a fishing rod and attached reel, with the carrying case being of a unitary construction eliminating separable parts that can be lost or mislaid.

A particular objective of the present invention is to provide such a carrying case comprising (1) an elongate hollow tube having an open end for receiving a fishing rod therein, (2) an enlarged chamber integrally connected to the open end of the tube, with the chamber having an open rearward end through which a rod and reel can be inserted to position the rod in the hollow tube and the reel in the housing, and (3) a closure member pivotally attached to the sides of the chamber for movement between a closed position fitting against and closing the open rearward end of the chamber and an open position in which the closure member pivots downwardly beneath the chamber to expose the entire open rearward end of the chamber.

A further objective of the present invention is to provide such a carrying case further comprising a simple, manually operated, releasable locking mechanism associated with the chamber for locking the closure member in its closed position.

BRIEF DESCRIPTION OF THE INVENTION

The above objectives are achieved in accordance with the present invention by providing a novel, unique carrying case for a fishing reel and an attached reel. The carrying case has an elongate hollow tube that is closed at its first end and is adapted to receive a fishing rod therein from its open, second end. A reel receiving chamber is attached to the open, second end of the tube. The chamber has opposite sides, a closed top and a forward wall having an opening in alignment with the open end of the tube. The rearward end of the chamber is open such that a rod and an attached reel can be received through the open rearward end of the chamber to position the rod in the tube and the reel in the chamber. A closure member is provided for fitting against and closing the open rearward end of the chamber. The closure member is pivotally attached to the sides of the chamber such that the closure member can be pivoted downwardly beneath the chamber to expose the open rearward end of the chamber.

Additional objects and features of the invention will become apparent from the following detailed description, taken together with the accompanying drawings.

THE DRAWINGS

A preferred embodiment of the present invention representing the best mode presently contemplated of carrying out the invention is illustrated in the accompanying drawings in which:

FIG. 2 is a side elevation of the carrying case of FIG. 1 showing the closure member of the reel receiving chamber in its closed position;

FIG. 3 is a side elevation similar to that of FIG. 2, but showing the closure member of the reel receiving chamber in its open position.

DETAILED DESCRIPTION OF THE ILLUSTRATED EMBODIMENTS

Figure 4:
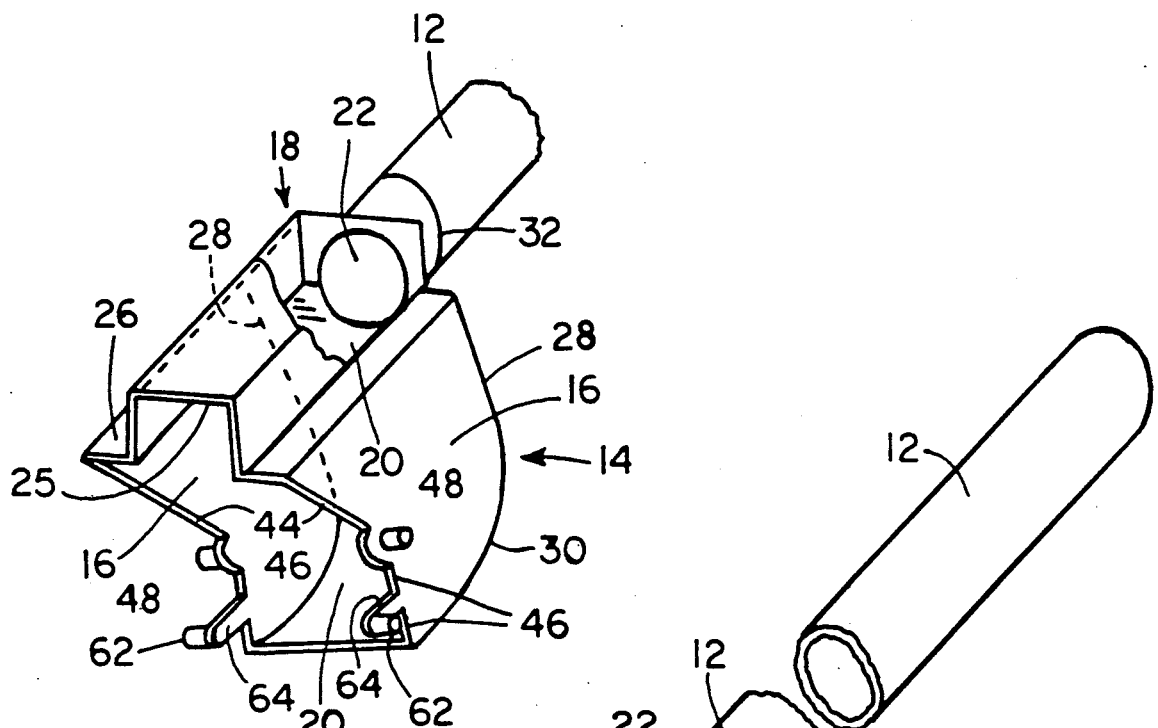
FIG. 4 is a pictorial of the reel receiving chamber of a modified embodiment of a carrying case in accordance with the present invention.

Referring to the drawings, there is shown a preferred embodiment of a carrying case for a fishing rod and reel. The carrying case comprises an elongate hollow tube 12 that is closed at its first or forward end. The hollow tube 12 is adapted to receive a fishing rod (not illustrated) therein from an open, rearward, or second end. A reel receiving chamber 14 is attached to the open, second end of the tube 12. The chamber 14 has opposite sides 16, a closed top 18 and a forward wall 20. The forward wall 20 has an opening 22 in alignment with the open end of the tube 12. The rearward end of the chamber 14 is open such that a rod and an attached reel (not illustrated) can be received through the open rearward end of the chamber 14 to position the rod in the tube 12 and the reel in the chamber 14.

In the preferred embodiment illustrated in the drawings, the top 18 of the chamber 14 comprises a semicircular tubular portion 24 that is in alignment with the upper portion of the tube 12. A pair of flanges 26 extend outwardly from the opposite longitudinal sides of the semicircular portion 24 to complete the top 18. The distance between the opposite, outer, longitudinal side edges of the flanges 26 is such as to provide sufficient width for the chamber 14 to accept a reel when attached to a pole that has been inserted into the tube 12. In FIG. 4, a modified embodiment is shown in which a rectangular, tubular portion 25 is employed instead of the semicircular tubular portion 24.

The chamber 14, as illustrated, further comprises substantially planar, opposite sides 16 that extend downwardly from the opposite, longitudinal side edges of the flanges 26. The forward edges 28 of the sides 16 of the chamber 14 drop downwardly a distance essentially perpendicularly from the top 18. The forward edges 28 then curve in a substantially circular edge 30 beneath the chamber 14 and toward the back of the chamber 14. The forward wall 20 bridges the edges 28 of the sides to form a substantially flat section facing the front of the carrying case. The curved portion of the front wall bridging the sides 30 forms a part of the front wall as well as a portion of the bottom of the chamber 14.

Figure 1:
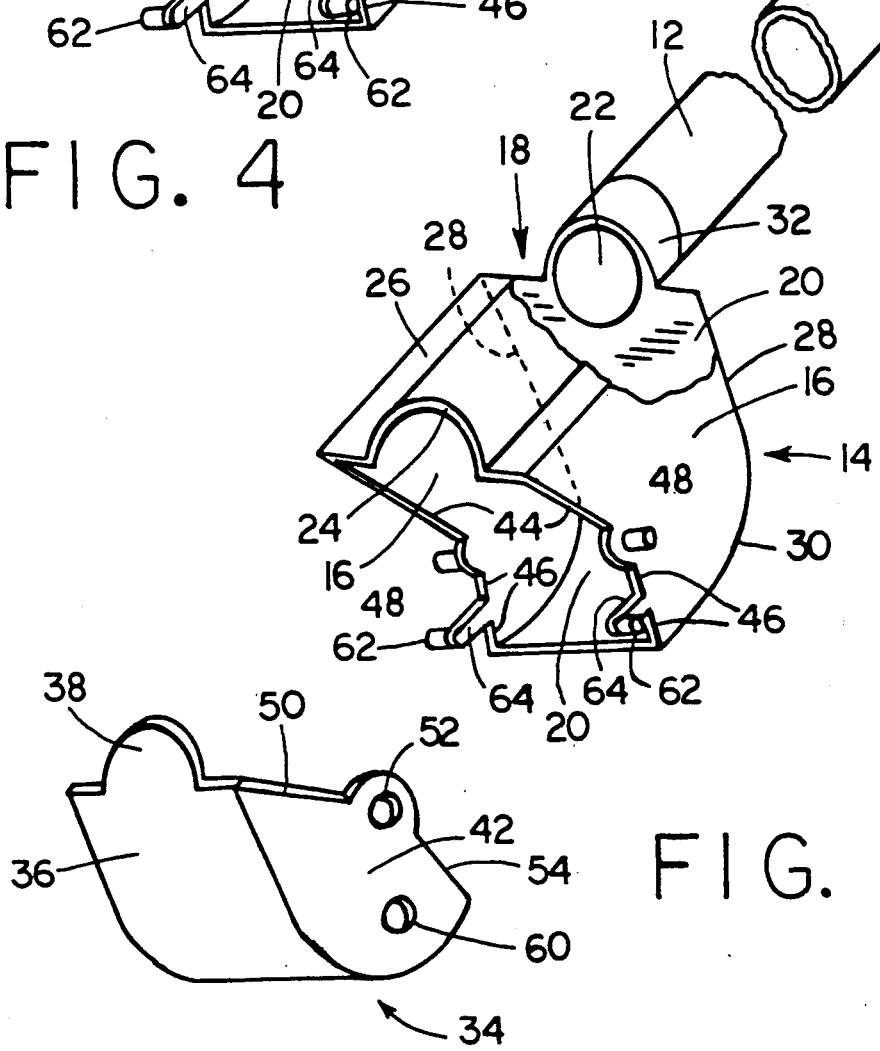
FIG. 1 is a pictorial representation of a carrying case in accordance with the present invention.

A nozzle 32 extends forwardly from the forward wall 20 as best shown in FIGS. 2 and 3. The nozzle 32 is circular in shape and opens into the chamber 14. The rear, open end of the tube 12 is advantageously received in the nozzle 32 as shown in FIG. 2. The end of the tube 12 can be cemented to the nozzle 32 by an appropriate cement. As can be seen from the drawings, the tube 12 opens into the chamber 14 so that the tubular portion 24 (FIGS. 1-3) or 25 (FIG. 4) of the top 18 of the chamber 14 is coaxially aligned with tube 12.

A closure member 34 is provided for fitting against and closing the open rearward end of the chamber 14. The closure member 34 preferably comprises a back plate 36 having a width sufficient to cover the open rearward end of the chamber 14. The lower end of the back plate 36 curves downwardly and forwardly. The curvature of the lower end of the back plate 36 is such that the back plate 36 can slide over the curved portion of the forward wall 20 of the chamber 14. A semicircular extension 38 projects upwardly from the top side edge of the back plate 36. The extension 38 covers the open end of the tubular portion 24 (FIGS. 1-3) or 25 (FIG. 4) of the top 18 of the chamber 14 when the closure member 34 is positioned against the open rearward end of the chamber 14. With the rectangular tubular portion 25 as shown in FIG. 4, the extension 38 would, of course, have a corresponding rectangular shape rather than a semicircular shape.

Means are provided for pivotally attaching the closure member 34 to the sides 16 of the chamber 14 such that the closure member 34 can be pivoted downwardly beneath the chamber 14 to expose the open rearward end of the chamber 14. In the illustrated embodiment, the means for pivotally attaching the closure member 34 to the sides 16 of the chamber 14 comprises side members 42 extending from the closure member 14 to lie alongside exterior surfaces of the sides 16 of the chamber 14 and a pair of pivot connectors for pivotally connecting the side members 42 to the sides 16 of the chamber 14.

In the illustrated embodiment, the upper, rearward edges 44 of the sides 16 slant from the rearward edges of the flanges 26 of the top 18 toward a central position in the chamber 14. The lower rearward edges 46 then extend generally downwardly to the back end of the forward wall 20. A pair of pivot buttons 48 extend outwardly from the sides 16 of the chamber 14 near the central portion thereof. The side members 42 of the closure member 34 have upper slanting edges 50 that overlap the upper rearward edges 46 of the sides 16 when the closure member 34 is in its closed position against the open rearward end of the chamber 14 as shown in FIG. 2.

An opening 52 is provided in each of the sides 42 of the closure member 34. The openings 52 fit over and receive the pivot button 48 of the sides 16 of chamber 14 so that the closure member 34 can pivot about an axis through the pivot buttons 48. The side members 42 of the closure member 34 have lower side edges 54 extending downwardly to overlap the lower edges 46 of the sides 16 of the chamber 14 when the closure member is in its closed position as shown in FIG. 2. As can be seen from that figure, the chamber 14 is completely enclosed when the closure member 34 is in its closed position.

The closure member 34 can be pivoted downwardly about the pivot buttons 48 to an open position as shown in FIG. 3. The curved portion of the back plate 36 of the closure member 34 slides about the outer curved surface of the forward wall 20 of the chamber 14, and the upper end of the back plate 36 pivots to a position beneath the open end of the chamber 14 as shown in FIG. 3. In this open position of the closure member 34, a fishing rod with reel attached is easily inserted into the carrying case. The pole is inserted through the open end of the chamber 14 into the tube 12, and the reel is received in the chamber 14. The closure member 34 can then be moved to its closed position as shown in FIG. 2 to fully contain the fishing rod and attached reel in the carrying case.

Advantageously, the carrying case is further provided with a releasable locking means for retaining the closure member 34 in its position closing the open rearward end of the chamber 14. As illustrated, the releasable locking means comprises an opening 60 in at least one of the side members 42 of the closure member 34 and preferably in both side members 42. A push button extends from the chamber 14 to engage the opening 60 in the side member 42 when the closure member 34 is in its position closing the open rearward end of the chamber 14.

In the illustrated embodiment, the push button comprises a cylindrical button 62 extending from a resilient leg 64 that is attached to the lower side edges 46 of the sides 16 of the chamber 14. The resilient legs 64 allow the push buttons 62 to be depressed so as to disengage the openings 60, thereby allowing the side members 42 of the closure member 34 to move in their pivotal movement relative to the chamber 14. As shown in FIG. 3, the push button 62 rides below the side member 42 of the closure member 34 so that when the closure member 34 is moved back to its closed position as shown in FIG. 3, the push button 62 reengages the opening 60 in the closure member 34.

Although a preferred embodiment of the carrying case of the present invention has been illustrated and described, it is to be understood that the present disclosure is made by way of example and that various other embodiments are possible without departing from the subject matter coming within the scope of the following claims, which subject matter is regarded as the invention.

We claim:

1. A carrying case for a fishing rod and reel, comprising:
    an elongate hollow tube that is closed at its first end and is adapted to receive a fishing rod therein from its open, second end;
    a reel receiving chamber attached to the open, second end of said tube, said chamber having opposite, substantially planar sides, a closed top and a forward wall having an opening in alignment with the open end of said tube, with the rearward end of said chamber being open such that a rod and an attached reel can be received through the open rearward end of said chamber to position the rod in the tube and the reel in said chamber;

a closure member for fitting against and closing the open rearward end of said chamber; and means for pivotally attaching said closure member to the sides of said chamber such that the closure member can be pivoted downwardly beneath said chamber to expose the open rearward end of said chamber, wherein the means for pivotally attaching the closure member to the sides of said chamber comprises side members extending from the closure member to lie alongside exterior surfaces of the sides of said chamber and a pair of pivot connectors for pivotally connecting said side members to the sides of said chamber.

2. A carrying case for a fishing rod and reel in accordance with claim 1, wherein there is further provided releasable locking means for retaining said closure member in its position closing the open rearward end of said chamber.

3. A carrying case for a fishing rod and reel comprising:

an elongate hollow tube that is closed at its first end and is adapted to receive a fishing rod therein from its open, second end;

a reel receiving chamber attached to the open, second end of said tube, said chamber having opposite, substantially planar sides, a closed top and a forward wall having an opening in alignment with the open end of said tube, with the rearward end of said chamber being open such that a rod and an attached reel can be received through the open rearward end of said chamber to position the rod in the tube and the reel in said chamber;

a closure member for fitting against and closing the open rearward end of said chamber; and means for pivotally attaching said closure member to the sides of said chamber such that the closure member can be pivoted downwardly beneath said chamber to expose the open rearward end of said chamber, wherein the means for pivotally attaching the closure member to the sides of said chamber comprises side members extending from the closure member to lie alongside exterior surfaces of the sides of said chamber and a pair of pivot connectors for pivotally connecting said side members to the sides of said chamber; and releasable locking means fore retaining said closure member in its position closing the open rearward end of said chamber, wherein the releasable locking means comprises an opening in at least one of the side members; and a push button extending from said chamber to engage the opening in said side member when the closure member is in its position closing the open rearward end of said chamber.

wherein the push button can be depressed to release its engagement with said opening in the side member thereby allowing the side member to move in its pivotal movement relative to said chamber.

* * * * *